Patented Mar. 25, 1952

2,590,412

UNITED STATES PATENT OFFICE 2,590,412

METHOD OF WORKING UP THE WASTE LIQUOR OF FERMENTATION INDUSTRIES IN WHICH MOLASSES ARE USED

Max Petrus Jozef Maria Jansen, Bergen op Zoom, Netherlands, assignor to N. V. Zuid-Nederlandsche Spiritusfabriek, Bergen op Zoom, Netherlands, a corporation of the Netherlands No Drawing. Application November 2, 1948, Serial No. 58,013. In the Netherlands November 14, 1947

3 Claims. (Cl. 23—63)

Fermentation industries in which molasses is wholly or partially used as a raw material obtain, as a waste product of the fermentation process, the stillage or slop which contains constituents of the molasses, more particularly potassium salts. Attempts have been made to recover the mineral constituents of the molasses, which on account of their high potassium content represent a value that is not to be neglected.

Up to the present time the recovery of the mineral substances has been effected by evaporating the stillage, for example, a third of its original volume, which is generally done in multiple effect apparatus, and subsequently burning the evaporated stillage in ovens, such as the so-called Porion-ovens and Garner oven (cf. Foth; "Handbuch der Spiritusfabrikation 1929, page 456 et seq.). The said ovens are comparatively primitive and in principle consist of an evaporating chamber in which additional water is removed from the thickened slop, and a combustion chamber in which the mass is incinerated.

The gases developed during the process are conducted through the evaporating chamber, whereby a portion of the water still present in the slop is evaporated. In this manner there is obtained a residue of varying composition depending upon the nature of the molasses and the process applied, and which, for example, may have the following composition:

| | Per cent |
|---|---|
| Potassium carbonate | 20 to 50 |
| Sodium carbonate | 10 to 20 |
| Potassium chloride | 10 to 17 |
| Potassium sulphate | 10 to 17 |
| Insolubles | 9 to 30 |

The limits mentioned in the above example may be widely varied, particularly when cane sugar molasses is used.

The above described residue may be separated into its components by means of fractionated crystallization. The value of the mineral substances contained in the residue is chiefly dependent on the potassium carbonate content, as this salt is extensively used for technical purposes, whereas potassium sulphate and potassium chloride can from a practical standpoint only be used as fertilizers, and consequently they are of much lesser value.

The above mentioned method of working up the stillage is very unsatisfactory. In the first place, the evaporation of the liquor requires a great deal of steam, while the tending of the machines requires much manual labor under very disagreeable conditions. For this reason the process is an expensive one. With the result that in certain regions the working up of the waste liquor has been completely abandoned and the draff is sold for fertilizer at a very low price, whereas in other regions this liquor is converted into "crude potassium carbonate," not for profit but merely for the purpose of avoiding difficulty with the waste water.

The present invention relates to a process that is free from the above-mentioned drawbacks, and which at the same time makes possible a much higher yield of potassium carbonate. This process consists in burning the waste liquor after evaporation of the greater part of the water contained in the same, with a limited quantity of air, with the result that the potassium sulphate present in the slop is entirely or for the greater part reduced to potassium sulfide. Thereafter, the potassium sulfide is converted into potassium carbonate by reacting the potassium sulphide with carbon dioxide.

The waste liquor obtained by the fermentation process is first evaporated according to well known methods until the content of dry solids is sufficient for the next treatment, for example, between 50 and 60%. This concentrated waste liquor is then burned and this burning is preferably effected in a continuous manner by causing the mass to fall through hot combustion gases into the combustion zone of the furnace. The combustion is effected with the admission of a limited quantity of air, the quantity of air being sufficient to burn the organic matter, while at the same time permitting the potassium sulphate to be reduced entirely or to a large extent to potassium sulfide by the carboniferous substances formed during the combustion process. The combustion heat is sufficient to keep the process going. The molten residue is continuously discharged from the oven and dissolved in water, immediately or at a subsequent time. When carbon dioxide is introduced into this solution, the potassium sulfide is converted into potassium carbonate and hydrogen sulfide is produced, which, if desired, may be recovered as such or in the form of other sulphur compounds.

In this manner there is obtained a solution containing in addition to a large quantity of potassium carbonate only moderate quantities of other salts, such as potassium chloride and sodium carbonate, and, occasionally, small quantities of unconverted potassium sulphate. From this solution the potassium carbonate may be recovered in solid form. The yield of this salt will be much higher than in the prior processes, since according to the present method the potassium sulphate originally present is now also recovered in the form of potassium carbonate.

It is possible to increase the yield of potassium carbonate still further by adding to the waste liquor or evaporated waste liquor potassium sulphate, either in solid form or in the form of a solution. The quantity of potassium sulphate to be added must be such that it is entirely or at least for the greater part reduced to potassium sulfide. This depends, inter alia, on the composition of the waste liquor and it is therefore advantageous to ascertain by a simple routine test how much potassium sulphate may be added to a given charge of waste liquor.

The method according to the present invention is also important for the treatment of stillage derived from cane sugar molasses, since in this material the potassium carbonate content is low, while the potassium sulphate content is high. Because of this high potassium sulphate content the conversion of the waste liquor obtained from cane sugar molasses into potassium carbonate according to the usual methods is very unattractive, whereas the method according to the present invention is eminently suitable for the purpose.

The invention is also valuable for other fermentation industries using molasses, in which, for example, by the addition of sulphuric acid, the proportion of potassium compounds which finally may be recovered in the form of potassium carbonate, is considerably reduced (manufacture of baker's yeast, organic acids, etc.).

The combustion gases leaving the oven have a high temperature and may be used if desired for producing steam in a boiler. This may be done on such a scale that the evaporation of the liquor to a solid matter content of from 50 to 60% is effected entirely by means of the steam thus produced.

The novel process of the invention means a great saving in labor cost as it has been found that only a third of the number of men is needed for attending the ovens as compared with the prior processes. The disagreeable work mentioned above in connection with prior processes may be entirely done away with when using the method of the invention.

I claim:

1. Method of working up the waste liquor of fermentation industries to recover the potassium values thereof in the form of potassium carbonate comprising burning the evaporated waste liquor with a quantity of air insufficient to prevent the reduction to potassium sulfide of the greater part of the potassium sulphate contained in the waste liquor by the carboniferous substances formed in situ during the combustion process to form a salt mixture comprising potassium carbonate and potassium sulfide, dissolving the salt mixture obtained in water, introducing carbon dioxide into the solution so as to convert the potassium sulfide into additional potassium carbonate and separating the potassium carbonate from the solution.

2. Method according to claim 1 wherein the concentrated waste liquor is allowed to fall through the hot combustion gases into the combustion zone of the furnace in which the dehydrated waste liquor is burned.

3. Method of working up the waste liquor of fermentation industries to recover the potassium values thereof in the form of potassium carbonate comprising adding potassium sulphate to said waste liquor, burning the evaporated waste liquor with a quantity of air insufficient to prevent the reduction to potassium sulfide of the greater part of the potassium sulphate contained in the waste liquor by the carboniferous substances formed in situ during the combustion process to form a salt mixture comprising potassium carbonate and potassium sulfide, dissolving the salt mixture obtained in water, introducing carbon dioxide into the solution so as to convert the potassium sulfide into additional potassium carbonate and separating the potassium carbonate from the solution.

MAX PETRUS JOZEF MARIA JANSEN.

REFERENCES CITED

The following references are of record in the file of this patent:

UNITED STATES PATENTS

| Number | Name | Date |
| --- | --- | --- |
| 1,303,916 | Kermer et al. | May 26, 1919 |
| 1,360,046 | Stevenson | Nov. 23, 1920 |
| 1,376,662 | Whittaker | May 3, 1921 |
| 1,400,192 | Whittaker | Dec. 13, 1921 |
| 1,979,151 | Fricke et al. | Oct. 30, 1934 |

FOREIGN PATENTS

| Number | Country | Date |
| --- | --- | --- |
| 819 | Great Britain | 1869 |
| 14,483 of 1890 | Great Britain | July 18, 1891 |
| 166,657 | Great Britain | July 13, 1921 |
| 286,210 | Great Britain | Dec. 31, 1927 |
| 386,208 | Great Britain | Jan. 12, 1933 |
| 392,765 | Great Britain | Mar. 25, 1933 |
| 210,273 | Germany | May 25, 1909 |

OTHER REFERENCES

J. W. Mellor's "A Comprehensive Treatise on Inorganic and Theoretical Chemistry," vol. 2, 1922 ed., pages 672, 712. Longmans, Green & Co., N. Y.

Hackh's "Chem. Dictionary," 2nd ed., page 987. P. Blackiston & Son, Inc., Philadelphia.